(12) United States Patent
Bastin et al.

(10) Patent No.: US 6,345,772 B1
(45) Date of Patent: *Feb. 12, 2002

(54) FIELD MARKING SYSTEM

(75) Inventors: Bruce G. Bastin, Starbuck; Luke D. Prouty, Benson, both of MN (US)

(73) Assignee: Case Corporation, Racine, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/364,097

(22) Filed: Jul. 30, 1999

(51) Int. Cl.[7] .............................. B05B 1/20; B05B 3/02; B05B 1/16
(52) U.S. Cl. ..................... 239/159; 160/163; 160/170
(58) Field of Search ................................. 239/159, 160, 239/161, 162, 163, 170, 172, 129; 60/600

(56) References Cited

U.S. PATENT DOCUMENTS

| | | | |
|---|---|---|---|
| 3,090,562 A | 5/1963 | Richardson | 239/172 |
| 3,211,381 A * | 10/1965 | Rasmussen | 239/172 |
| 3,219,275 A * | 11/1965 | Greeen | 239/172 |
| 3,339,843 A * | 9/1967 | Horton | 239/172 |
| 3,395,503 A | 8/1968 | Greenburg et al. | 239/172 |
| 3,425,407 A | 2/1969 | Furman et al. | 239/172 |
| 3,453,678 A | 7/1969 | Gehman et al. | 239/172 |
| 3,481,545 A | 12/1969 | Cooke et al. | 239/172 |
| 3,554,009 A | 1/1971 | Van der Veen | 73/438 |
| 3,584,788 A * | 6/1971 | Lloyd | 239/172 |
| 3,627,057 A | 12/1971 | Hartwig et al. | 172/271 |
| 3,887,132 A | 6/1975 | Widmer | 239/166 |
| 3,972,476 A | 8/1976 | Hall | 239/167 |
| 4,011,914 A | 3/1977 | Elmer | 239/172 |
| 4,044,914 A | 8/1977 | Hopkins et al. | 220/93 |
| 4,044,952 A | 8/1977 | Williams et al. | 239/165 |
| 4,221,353 A | 9/1980 | Kuhn et al. | 239/166 |
| 4,288,034 A | 9/1981 | Widmer et al. | 239/168 |
| 4,429,532 A * | 2/1984 | Jakuba | 60/600 |
| 4,441,655 A | 4/1984 | Blumhardt | 239/163 |
| 4,634,051 A | 1/1987 | Dudley | 239/168 |
| 4,643,358 A | 2/1987 | Jackson | 239/166 |
| 4,825,957 A | 5/1989 | White et al. | 172/126 |
| 4,834,249 A | 5/1989 | Dahl | 239/172 |
| 4,880,160 A | 11/1989 | Patterson et al. | 239/167 |
| 5,027,525 A | 7/1991 | Haukaas | 33/624 |
| 5,031,834 A * | 7/1991 | Simpson | 239/172 |
| 5,044,557 A * | 9/1991 | Smith | 239/302 |
| 5,052,618 A | 10/1991 | Carlon et al. | 239/129 |
| 5,133,500 A * | 7/1992 | Simpson | 239/170 |

(List continued on next page.)

Primary Examiner—David A. Scherbel
Assistant Examiner—Davis Hwu
(74) Attorney, Agent, or Firm—Foley & Lardner

(57) ABSTRACT

A field marking system includes a marking solution storage tank, a mixing volume fluidly connected to the storage tank and configured to mix marking solution from the storage tank with pressurized air, a nozzle fluidly connected to the mixing volume and an engine including a turbocharger. The turbocharger supplies pressurized air to at least one of the solution storage tank and the mixing volume. In one exemplary embodiment, the turbocharger supplies pressurized air to both the solution storage tank and the mixing volume. The marking system additionally includes a valve connected between the solution storage tank and the mixing volume and a control circuit coupled to the valve. In one exemplary embodiment, the control circuit generates a control signal such as the valve modulates based upon the control signal to vary production of marking medium. In one exemplary embodiment, the marking system further includes a vent valve connected to the solution storage tank and a fill valve connected to the solution storage tank. The vent valve and the fill valve are configured such that the fill valve cannot be opened until the vent valve is opened. In one exemplary embodiment, the field marking system is configured as part of a sprayer.

21 Claims, 5 Drawing Sheets

U.S. PATENT DOCUMENTS

| | | | |
|---|---|---|---|
| 5,248,091 A | 9/1993 | Thyberg | 239/168 |
| 5,408,756 A | 4/1995 | Wahls | 33/624 |
| 5,485,796 A | 1/1996 | Bassett | 172/126 |
| 5,522,543 A * | 6/1996 | Herzog | 239/163 |
| 5,542,190 A | 8/1996 | Wahls | 33/624 |
| 5,551,309 A * | 9/1996 | Goossens et al. | 73/863 |
| 5,552,543 A | 9/1996 | Wolfe et al. | 544/58.4 |
| 5,630,547 A | 5/1997 | Klemenhagen et al. | 239/161 |
| 5,636,792 A * | 6/1997 | Sauter et al. | 239/172 |
| 5,687,762 A * | 11/1997 | Teets et al. | 137/588 |
| 5,785,128 A | 7/1998 | Redekop | 172/176 |
| 5,820,030 A * | 10/1998 | Littrell | 239/172 |
| 5,906,480 A * | 5/1999 | Sabelstrom et al. | 60/609 |

\* cited by examiner

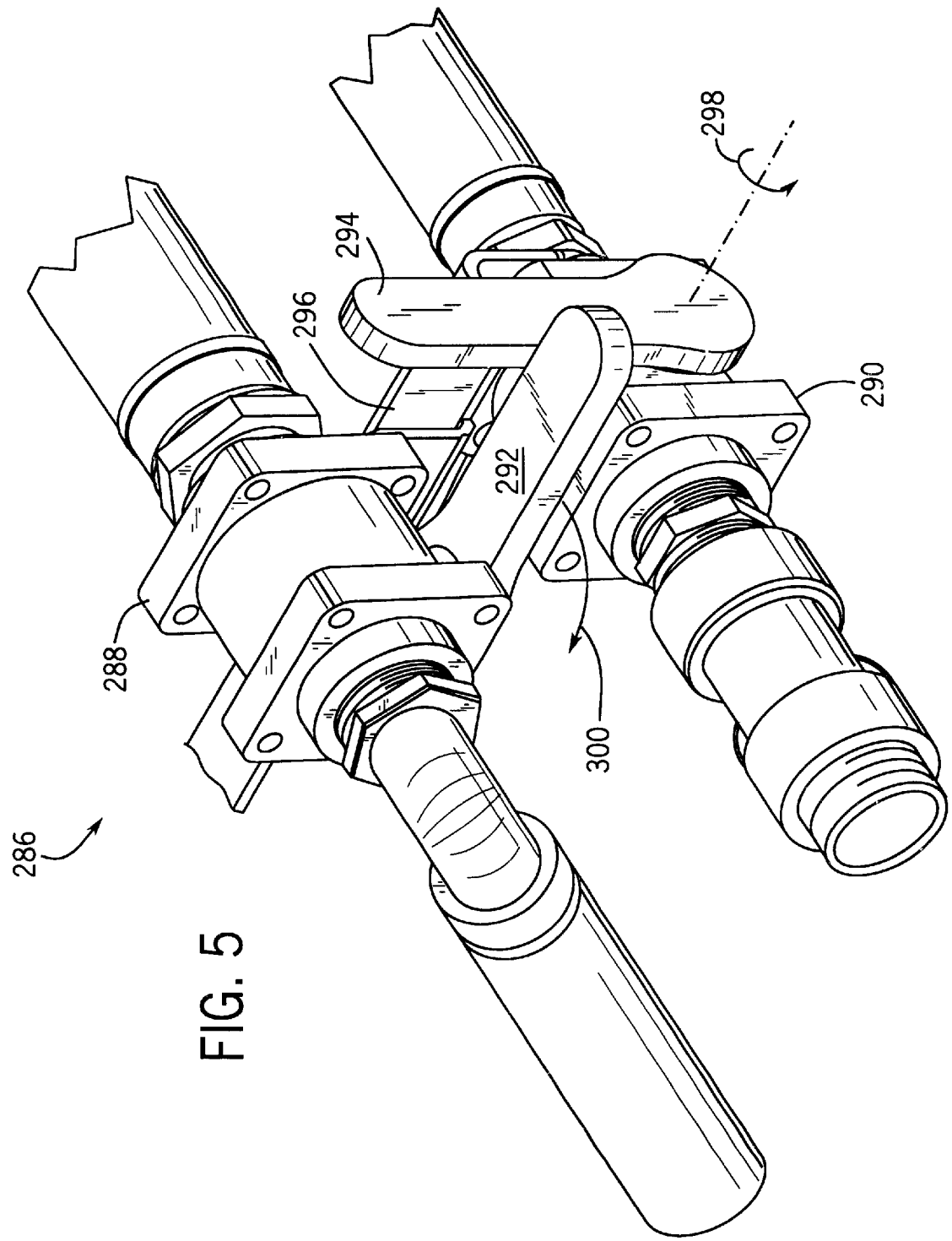

FIELD MARKING SYSTEM

FIELD OF THE INVENTION

The present invention relates to agricultural applicating systems. In particular, the present invention relates to agricultural field marking systems. Even more particular, the present invention relates to a foam field marking system.

BACKGROUND OF THE INVENTION

Field marking systems are employed on a variety of agricultural vehicles and implements to indicate and distinguish worked and unworked portions of the field. For example, field marking systems are commonly employed on planters to indicate those portions of those fields which have been planted. Field marking systems are commonly employed on granular or liquid fertilizer, insecticide and herbicide applicators to indicate those portions of the field which have received the fertilizer, insecticide or herbicide during a path across the field.

Field marking systems generally either consist of a mechanical field scribing device, such as a disk which creates an indentation in the soil, or a foam marking device which sprays a foam or other marking solution upon the soil. The foam marking systems typically create the foam by mixing a liquid foaming solution with pressurized air. The pressurized air is typically provided by either a mechanical air compressor driven off the engine or an electrically driven pump or compressor. Those marking systems utilizing a mechanical air compressor driven off the engine require a greater horsepower engine. Those marking systems utilizing electric pumps require a large amperage of electrical power, requiring a larger and more expensive electrical alternator. As a result, such foam marking systems are more expensive to manufacture and operate.

In addition to requiring dedicated air supplies, conventional foam marking systems also require relatively complicated mechanisms for controlling the amount and rate at which foam is produced. Conventional foam marking systems utilize a complex series of valves and orifices to control or vary the amount of foam being produced. This further increases the complexity and cost of such foam marking systems. Furthermore, in addition to being complex and expensive, such conventional foam marking systems are time consuming and difficult to operate and maintain. In addition, because conventional foam marking systems pressurize the storage tank containing the liquid foam solution, the pressurized air within the storage tank will frequently spray and eject the liquid foam solution on to the user during refilling of the storage tank.

Thus, there is a continuing need for a foam marking system which requires fewer parts, which requires less horsepower or less electrical amperage, which provides for simple control of foam production and which may be easily operated and supplied with liquid foam solution.

SUMMARY OF THE INVENTION

The present invention provides a field marking system that includes a marking solution storage tank, a mixing volume fluidly connected to the storage tank and configured to mix marking solution from the storage tank with pressurized air, a nozzle fluidly connected to the mixing volume and an engine including a turbocharger. The turbocharger supplies pressurized air to at least one of the marking solution storage tank and to the mixing volume.

The present invention also provides a field marking system including a foam solution storage tank, a mixing volume fluidly connected to the storage tank and configured for mixing foam solution from the foam solution storage tank with pressurized air, a nozzle fluidly connected to the mixing volume, a source of pressurized air pneumatically connected to the mixing volume, a valve connected between the foam solution storage tank and the mixing volume, and a control circuit coupled to the valve. The control circuit generates a control signal. The valve modulates based upon the control signal to vary foam production.

The present invention also provides a sprayer including a chassis, a plurality of ground-engaging motive members supporting the chassis, an engine supported by the chassis, a transmission operably connecting the engine and the plurality of ground-engaging motive members, a main fluid storage tank supported by the chassis, a boom extending from the chassis, a plurality of nozzles carried by the boom and fluidly coupled to the main storage tank, a foam solution storage tank, a mixing volume fluidly connected to the foam solution storage tank and configured to mix the foam solution from the foam solution storage tank with pressurized air, a nozzle carried by the boom and fluidly connected to the mixing volume, and a turbocharger. The turbocharger supplies pressurized air to the engine and also supplies pressurized air to the mixing volume.

The present invention also provides a field marking system for use with a vehicle having an engine with a turbocharger. The system includes a marking solution storage tank, a mixing volume fluidly connected to the storage tank and configured for mixing marking solution from the storage tank with pressurized air, and a nozzle fluidly connected to the mixing volume. The mixing volume is adapted to be pneumatically coupled to the turbocharger, whereby the turbocharger supplies pressurized air to the mixing volume and the field marking system.

The present invention also provides an agricultural applicating system which includes the material storage tank, a mixing volume connected to the storage tank and configured to mix material from the material storage tank with the pressurized air, a material applicator connected to the mixing volume and an engine including a turbocharger. The turbocharger supplies pressurized air to the mixing volume.

BRIEF DESCRIPTION OF THE DRAWINGS

FIG. 5 is a fragmentary perspective view of an exemplary valve system for venting and filling a foam solution tank of the field marking system of FIG. 4.

DETAILED DESCRIPTION OF THE PREFERRED EMBODIMENTS

Figure 1:
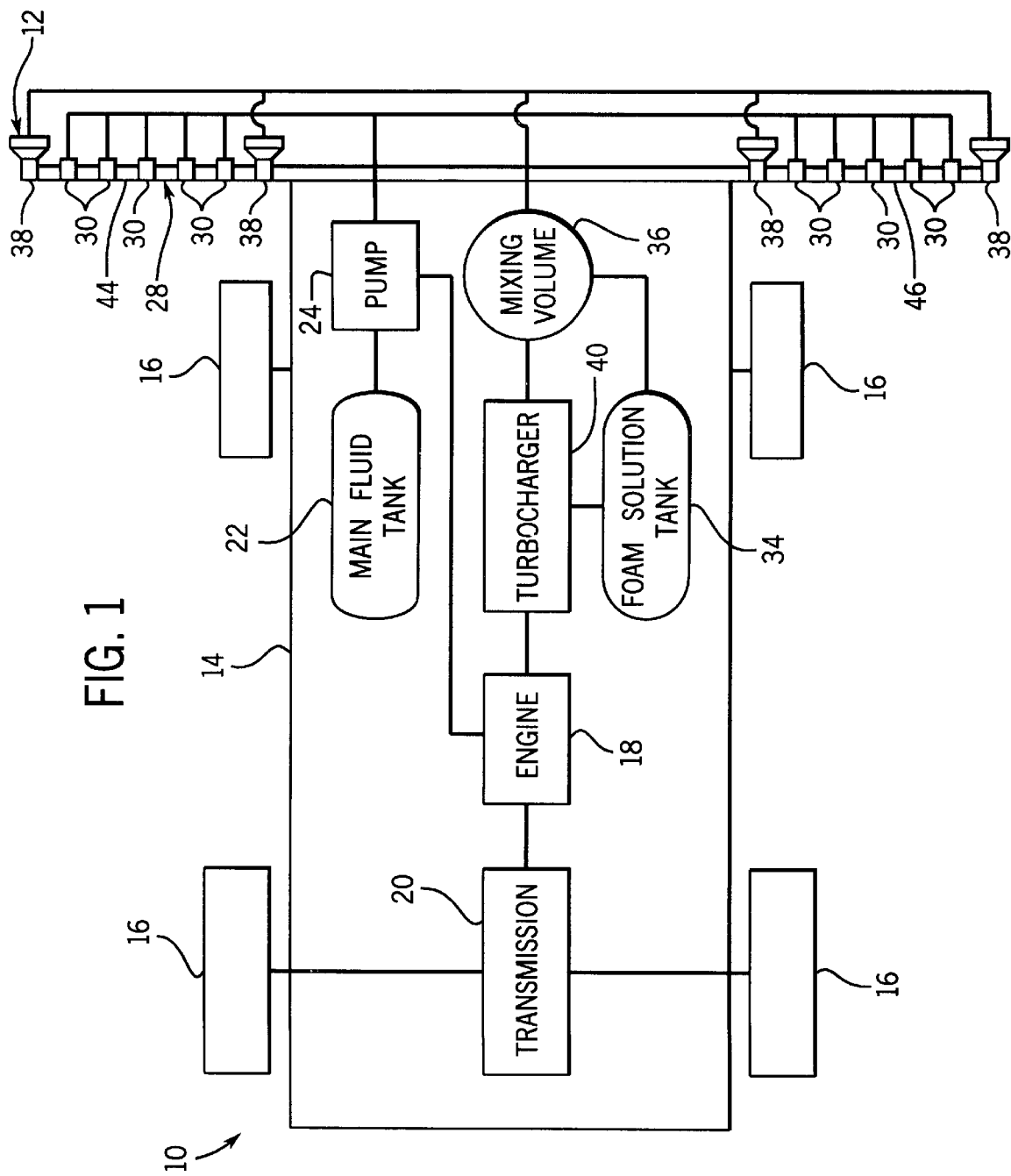
FIG. 1 is a schematic view of a self-propelled sprayer including a field marking system of the present invention.
Figure 2:
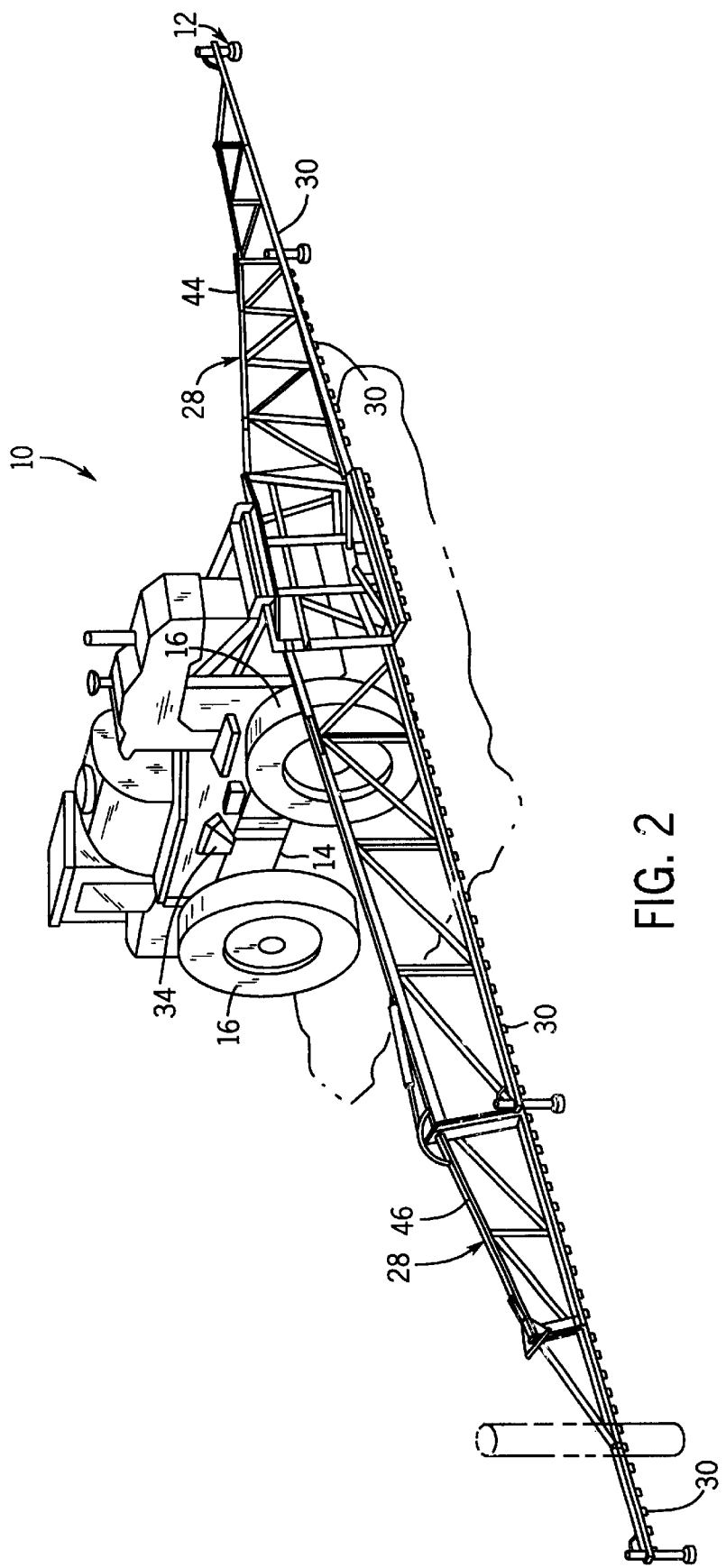
FIG. 2 is a rear perspective view of an exemplary embodiment of the sprayer and field marking system schematically shown in FIG. 1.

FIG. 1 is a schematic view of a self-propelled sprayer 10 including an exemplary embodiment of a field marking system 12 of the present invention. FIG. 2 is a rear perspective view of one exemplary embodiment of sprayer 10. As will be appreciated, the components of sprayer 10 and field marking system 12 schematically illustrated in FIG. 1 may be embodied in a multitude of differently configured self-propelled sprayers having different sizes, shapes and assembled positions. As best shown by FIG. 1, sprayer 10 generally includes chassis 14, ground-engaging motive members 16, engine 18, transmission 20, main fluid tank 22, pump 24, boom 28 and main nozzle 30. Field marking system 12 includes foam solution tank 34, mixing volume 36, marking nozzle 38 and turbocharger 40. Chassis 14, ground-engaging motive member 16, engine 18, transmission 20, boom 28, main nozzle 30 and turbocharger 40 are conventionally known components. Chassis 14 comprises a conventionally known frame which is configured to support boom 28 as well as a majority of the other components of sprayer 10. Ground-engaging motive members 16 support chassis 14 above the ground or other growing medium and are driven by engine 18 and transmission 20 in a conventionally known manner. Although ground-engaging motive member 16 are illustrated as comprising wheels, ground-engaging motive member 16 may alternatively comprise tracks or other means for moving chassis 14 and sprayer 10 across the growing medium.

Engine 18 comprises a conventionally known diesel engine equipped with a turbocharger, such as turbocharger 40. As conventionally known, turbocharger 40 supplies compressed air to engine 18 to improve the power output and efficiency of engine 18. In the exemplary embodiment, turbocharger 40 has a first fan driven by engine exhaust and a second fan which draws external or ambient air into the intake of the engine where the air becomes pressurized. In the exemplary embodiment, turbocharger 40 is manufactured as part of engine 18. Turbocharger 40 pressurizes air to a pressure of about 27 pounds per square inch under maximum full load of engine 18. In the exemplary embodiment, turbocharger 40 produces approximately 700 cubic feet a minute of air.

Transmission 20 is conventionally known and operably coupled engine 18 to ground-engaging motive member 16 so as to drive ground-engaging motive members 16.

Main fluid tank 22 stores fluid, such as herbicide, insecticide or fertilizer, and is fluidly connected to pump 24. Pump 24 pumps the fluid from tank 22 to main nozzles 30 which spray the fluid on to or into the growing medium in a conventionally known manner. In the exemplary embodiment, pump 24 is mechanically connected to engine 18 and is driven by engine 18. Alternatively, pump 24 may be connected to engine 18 hydraulically or electrically. In lieu of being driven by engine 18, pump 24 may also be driven by alternative power sources or by dedicated power sources. Furthermore, in particular applications, fluid from tank 22 may be supplied to nozzle 30 with the assistance of pressurized air or other pressurized mediums.

Boom 28 is supported by chassis 14 and extends transversely outward from chassis 14. In the exemplary embodiment, boom 28 includes opposite wings 44, 46 extending away from chassis 14. Boom 44 carries and supports main nozzles 30 as well as marking nozzles 38 at spaced locations along an axis generally transverse to chassis 14.

Field marking system 12 produces and applies a foam solution to the growing medium or ground at selected points along boom 28 to indicate to the operator those portions of the ground or growing medium to which fertilizer, insecticide or herbicide has been applied by main nozzles 30. Foam solution tank 34 is supported by chassis 14 and provides a reservoir for the foam solution. Tank 34 is fluidly connected to mixing volume 36 so as to supply foam solution to mixing volume 36. In the exemplary embodiment, tank 34 is pneumatically coupled to turbocharger 40 and is pressurized by the excess pressurized air produced by turbocharger 40.

Mixing volume 36 comprises a chamber, receptacle or other at least partially enclosed interior volume having a first input from tank 34 for marking solution, a second input from turbocharger 40 for pressurized air and an output through which the mixture of the pressurized air and the marking solution is expelled. Mixing volume 36 is fluidly connected to storage tank 34 and is configured to mix the foam solution received from tank 34 with pressurized air. In the exemplary embodiment, the pressurized air mixed with the foam solution from tank 34 is provided by turbocharger 40 which is pneumatically coupled to mixing volume 36. In particular, the pressurized air from turbocharger 40 mixes with the foam solution from tank 34 to create a foam, which under the force of pressurized air from turbocharger 40, is forced through fluid lines to each of marking nozzles 38. Marking nozzles 38 then apply the foam material to the soil. As will be appreciated, marking nozzles 38 may be replaced with a variety of different nozzles or even a variety of different applicators, in general, depending upon the type of foam or other medium which is being applied.

Overall, field marking system 12 provides a simple and inexpensive means for producing and applying foam to the soil or other growing medium to indicate to the operator those portions of the field on which nozzles 30 have applied pesticide, herbicide or fertilizer. As noted above, turbocharger 40 produces a larger amount of pressurized air than actually needed by engine 18. As a result, conventional engines employing turbochargers typically include ports or waste gates through which excess air and pressure is normally bled. However, in lieu of wasting such excess air pressure, field marking system 12 utilizes the pressurized air to produce foam. Because field marking system 12 utilizes the pressurized air already produced by turbocharger 40, field marking system 12 does not require a dedicated pump or other dedicated source of pressurized air. Field marking system 12 does not require a mechanical air compressor driven off of engine 18 which would otherwise increase the necessary horsepower of engine 18 or a dedicated electric pump which would otherwise draw a large amount of electrical current and thereby possibly require a larger alternator. Because field marking system 12 does not require such additional components, field marking system 12 occupies less space, is less complex and easier to repair and maintain, and is more easier to manufacture, assemble or install to an existing sprayer system.

Figure 3:
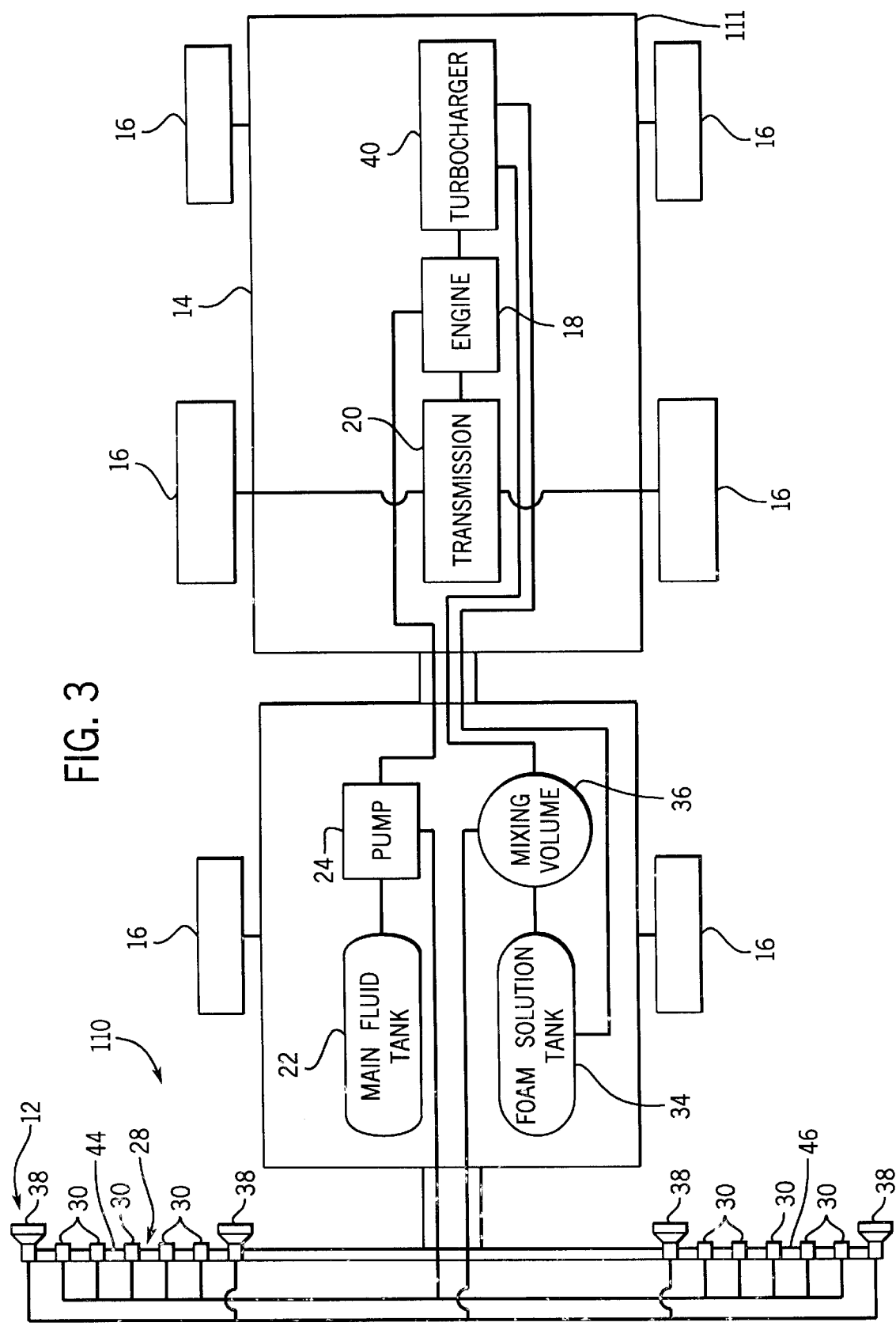
FIG. 3 is a schematic view of a work vehicle pulling a sprayer and including a field marking system of the present invention.

Although field marking system 12 is illustrated as part of a self-propelled sprayer 10, field marking system 12 may alternatively be employed as part of a sprayer pulled or pushed by an independent work vehicle, such as a tractor. FIG. 3 schematically illustrates sprayer 110 pulled by a work vehicle 111. For ease of illustration, those components of sprayer 110 and work vehicle 111 which correspond to the components of sprayer 10 are numbered similarly. As shown by FIG. 3, work vehicle 111 includes engine 18 and turbocharger 40. Field marking system 12 is constructed as part of sprayer 110. Tank 34 and mixing volume 36 are adapted to be pneumatically connected to turbocharger 40 of work vehicle 111. As with sprayer 10, sprayer 110 produces and applies a foam to the soil or growing medium without requiring a dedicated pressurized air source.

Figure 4:
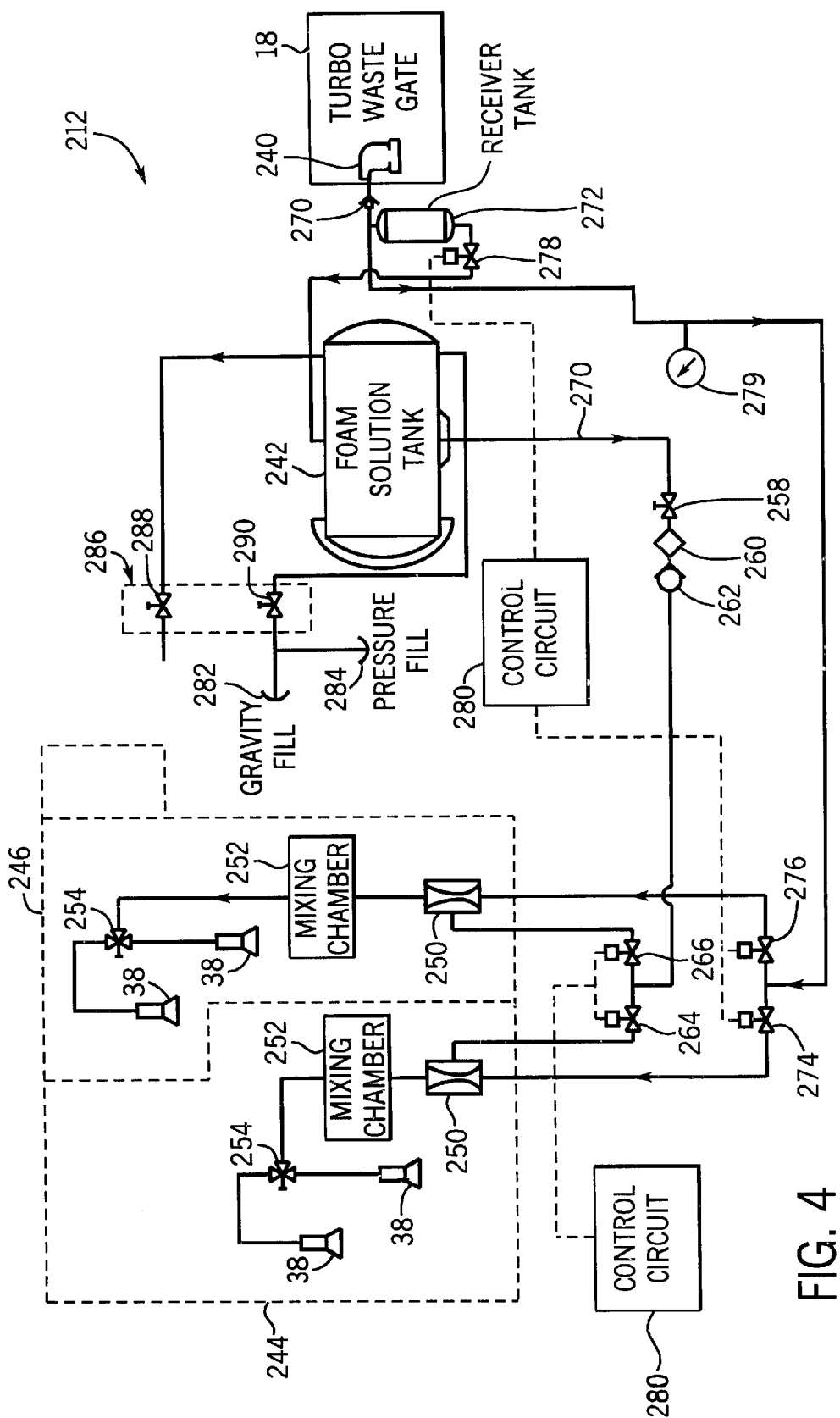
FIG. 4 is a schematic illustration of an alternative embodiment of the field marking system of FIG. 1.

FIG. 4 is a schematic illustration of field marking system 212, an alternative embodiment of field marking system 12 shown in FIG. 1. Field marking system 212 generally includes turbocharger 240, foam solution tank 242, and foam marker heads 244, 246. Turbocharger 240 is generally formed as part of engine 18, which in turn drives ground-engaging motive members 16 via transmission 20 (shown in FIG. 1). Similar to turbocharger 40, turbocharger 240 draws ambient air into the intake manifold of engine 18. Turbocharger 240 is pneumatically coupled to foam solution tank 242 and foam marker heads 244, 246 such that turbocharger 240 supplies pressurized air to foam solution tank 242 and foam marker heads 244 and 246. At the same time, foam solution tank 242 supplies foam solution to foam marker heads 244 and 246.

Foam marker heads 244 and 246 each provide an independent mixing volume as well as marker nozzles. In particular, each of marker heads 244, 246 include a venturi 250 and a mixing chamber 252 which serve as a mixing volume. Venturi 250 inject foam solution from tank 242 into a pressurized air stream provided by turbocharger 240. The mixture of foam solution and pressurized air is then mixed in mixing chamber 252. After mixing, the resulting foam is sprayed onto the soil or other growing medium by marking nozzles 38. Each marker head 244, 246 includes a three-way ball valve 254 between nozzles 38 and mixing chamber 252 to prevent backflow. In the exemplary embodiment, marker heads 244, 246 comprise parts E-1085, E-1224 and E-0395 currently sold by RICHWAY Industries, Ltd. located at 525 Main Street, Box 508, Janesville, Iowa 50647. As will be appreciated, a variety of differently configured marker heads may be employed in lieu of marker heads 244 and 246. Moreover, instead of the mixing volume (the location where the pressurized air and foam solution are first mixed) being formed as part of marker heads 244 and 246, the mixing volume may alternatively be formed at other locations along boom 28 or on the sprayer.

In addition to producing and applying a marking material, such as foam, without requiring a dedicated air pressure source, field marking system 212 is also more simple and inexpensive to control and operate and also produces a more consistent foam. As shown by FIG. 4, field marking system 212 includes valve 258, strainer 260, check valve 262, foam production valves 264, 266 and control circuit 268 fluidly or operably coupled between tank 242 and marker heads 244, 246. As indicated by arrow 270, the foam solution from tank 242 must first pass through valve 258. Valve 258 is a manual shut-off valve for manually controlling the supply of foam solution to marker heads 244, 246. When valve 258 is in an opened position, the foam solution further passes through strainer 260 and check valve 262 prior to reaching foam control valves 244 and 246. Check valve 262 insures that the liquid foam solution supplied to marker heads 244 and 246 are at a lower pressure than that of the air supplied to marker heads 244, 246. In the exemplary embodiment, check valve 262 comprises a 2.5 psi check valve such that the liquid foam solution always has a pressure of 2.5 pounds less than the pressurized air from turbocharger 240. In effect, check valve 262 serves as a regulator. Because the liquid foam solution provided to marker heads 244 and 246 is at a lower pressure as compared to the air supplied to marker heads 244 and 246, field marking system 12 produces very consistent foam.

Foam control valves 264 and 266 and control circuit 268 regulate foam production in a simple and inexpensive manner. Control valves 264 and 266 regulate the flow of liquid foam solution from tank 242 to heads 244 and 246, respectively. To control the flow of liquid foam solution to each of heads 244 and 246, valves 264 and 266 modulate based upon control signals generated by control circuit 268. In the exemplary embodiment, valves 264 and 266 comprise liquid on/off solenoid valves. Control circuit 268 comprises the conventionally known solid-state timing circuit with adjustable on-off times. Preferably, control circuit 268 is adjusted via controls located in a cab of the sprayer in which sprayer system 212 is employed. Thus, field marking system 212 controls foam production in a simple and cost-effective manner without a complicated series of orifices, valves and controls.

Field marking system 212 further provides for a simple and effective control of the supply of pressurized air from turbocharger 240 to foam solution tank 242 and marker head 244, 246. As shown by FIG. 4, field marking system 212 further includes check valve 270, receiver tank 272, head air control valves 274, 276, tank air control valve 278 and control circuit 280. Check valve 270 is pneumatically coupled between turbocharger 240 and receiver tank 272. Check valve 270 prevents an accidental backflow of air, foam solution or foam into engine 18. In the exemplary embodiment, check valve 270 comprises a 2.5 psi check valve.

Receiver tank 272 comprises a tank pneumatically coupled in parallel between turbocharger 240 and heads 244, 246 and pneumatically coupled in series between turbocharger 240 and foam solution tank 242. Receiver tank 272 stores air pressure for use by field marking system 212 to maintain a constant air pressure supply to head 244, 246. For example, when the engine is at high idle with no load, turbocharger 240 will produce less pressurized air. Tank 272 holds the pressure at high-engine load times for use at low-engine load times. In addition, tank 272 also serves as a scrubber tank by receiving backed up foam and foam solution in field marking system 212. Air within system 212 condenses within receiver tank 212 into a liquid which is then ejected once pressure within system 212 has reached adequate levels.

Valves 274 and 276 regulate the supply of pressurized air to each of heads 244 and 246, respectively. Similarly, valve 278 regulates the supply of pressurized air from turbocharger 240 to tank 242. The pressure of air supplied by turbocharger 240 to heads 244 and 246 is further indicated to the operator by gauge 279. In the exemplary embodiment, valves 274, 276 and 278 comprise conventionally known solenoid valves which open and close in response to electrical control signals from control circuit 280. Control circuit 280 is electrically coupled to valves 274, 276 and 278 and controls valves 274, 276 and 278 by selectively terminating the supply of power to valves 274, 276 and 278. In the exemplary embodiment, control circuit 280 is controlled by a control located in the cab of the sprayer.

As further shown by FIG. 4, the field marking system 212 provides for easy refilling of foam solution tank 242. Field marking system 212 includes a gravity fill 282, a pressure fill 284, and a valve system 286 including vent valve 288 and fill valve 290. Gravity fill 282 and pressure fill 284 are conventionally known fill mechanisms. Gravity fill 282 enables tank 242 to be refilled manually by a pail or other container through the use of gravity while pressure fill 284 enables tank 242 to be refilled utilizing a pressure source such as a pump.

Valve system 286 insures proper refilling of foam solution tank 242. Vent valve 288 comprises a manually operated valve moveable between an open position and a closed position. In the open position, pressurized air within tank 242 is vented. Fill valve 290 comprises a manual valve mechanism moveable between an open position and a closed position. In the open position, tank 242 may be refilled with foam solution through either gravity fill 282 or pressure fill 284. Vent valve 288 and fill valve 290 are configured such that fill valve 290 cannot be opened until vent valve 288 is opened. As a result, valve system 286 prevents unvented air pressure within tank 242 from forcefully ejecting foam solution through fill valve 290 once opened by the operator.

FIG. 5 illustrates valve system 286 in greater detail. As shown by FIG. 5, vent valve 288 and fill valve 290 each include manually operable control levers 292 and 294, respectively, shown in closed positions. Valves 288 and 290 are configured and supported by a bracket 296 such that control members 292 and 294 overlap and mechanically interlock with one another in their closed positions. In the exemplary embodiment, control members 292 and 294 pivot between the open and closed positions about axes substantially perpendicular to one another. To pivot fill valve control member 294 in the direction indicated by arrow 298 to an opened position first requires that vent valve control member 292 be pivoted to an opened position in the direction indicated by arrow 300. Thus, valve system 286 provides a simple and effective means for insuring that tank 242 is refilled with foam solution in the proper manner.

In sum, foam marking systems 12 and 212 provide a simple and cost-effective means for producing a marking material, such as foam, for indicating to the operator those portions of the field to which fertilizer, insecticide or herbicide has been applied. Although field marking system 212 is illustrated for use on a sprayer, field marking system 212 may be alternatively employed in a variety of alternative agricultural applications such as on planters and other agricultural implements. Furthermore, in lieu of utilizing a foam solution to produce foam as a marking medium, field marking systems 12 and 212 may be modified to apply other dry or liquid marking solutions or mediums by using excess pressurized air produced by the engine turbocharger. For example, field marking systems 12 and 212 may alternatively utilize pressurized air from the turbocharger to carry and apply colored marking fluids or even dry marking materials. Furthermore, in lieu of being used to apply merely marking substances, systems 12 and 212 may alternatively be modified to utilize excess pressurized air produced by the turbocharger to carry and apply liquid or dry materials for other purposes.

Although the present invention has been described with reference to preferred embodiments, workers skilled in the art will recognize that changes may be made in form and detail without departing from the spirit and scope of the invention. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A field marking system for use on a vehicle having ground engaging motive members, the system comprising:
   a marking solution storage tank;
   a mixing volume fluidly connected to the storage tank and configured to mix marking solution from the storage tank with pressurized air;
   a nozzle fluidly connected to the mixing volume; and
   an engine including a turbo charger, wherein the turbocharger supplies pressurized air directly without further mechanical compression to at least one of the storage tank and the mixing volume while the engine is driving the ground engaging motive members to propel the vehicle.

2. The marking system of claim 1 wherein the turbocharger supplies pressurized air to both the storage tank and the mixing volume.

3. The marking system of claim 1 including:
   a valve connected between the solution storage tank and the mixing volume; and
   a control circuit coupled to the valve, when the control circuit generates a control signal and wherein the valve modulates based upon the control signal to vary a rate at which the marking solution is applied.

4. The marking system of claim 3 wherein the valve comprises a solenoid valve.

5. The marking system of claim 4 wherein the control circuit comprises a solid state timer with adjustable on-off times.

6. The marking system of claim 1 including:
   a valve connected between the turbocharger and the mixing volumes; and
   a control circuit coupled to the valve and configured to generate a control signal, wherein the valve opens and closes based upon the control signal.

7. The marking system of claim 6 wherein the valve comprises a solenoid valve.

8. The marking system of claim 7 wherein the control circuit generates the control signal by selectively terminating the supply of power to the electric solenoid valve.

9. The marking system of claim 1 including a receiver tank pneumatically connected in parallel between the turbo charger and the mixing volume.

10. The marking system of claim 9 wherein the receiver tank is further pneumatically connected in series between the turbocharger and the storage tank.

11. The marking system of claim 10 including a valve connected in series between the receiving tank and the storage tank.

12. The marking system of claim 1 including:
    a vent valve connected to the tank; and
    a fill valve connected to the tank, wherein the vent valve and the fill valve are configured such that the fill valve cannot be opened until the vent valve is opened.

13. The marking system of claim 12 wherein the vent valve and the fill valve mechanically interlock such that the vent valve must be opened to enable the fill valve to be opened.

14. A sprayer comprising:
    a chassis;
    a plurality of ground engaging motive members supporting the chassis;
    an engine supported by the chassis;
    a transmission operably connecting the engine and the plurality of ground engaging motive members;
    a main fluid storage tank supported by the chassis;
    a boom extending from the chassis;
    a plurality of main nozzles carried by the boom and fluidly coupled to the main storage tank;
    a foam solution storage tank supported by the chassis;
    a mixing volume fluidly connected to the storage tank and configured for mixing foam solution from the foam storage tank with pressurized air;
    a nozzle carried by the boom and fluidly connected to the mixing volume; and a turbocharger coupled to the engine to supply pressurized air to the engine, and coupled to the mixing volume to supply pressurized air, without further mechanical compression, to the mixing volume while the engine is driving the ground engaging motive members to propel the vehicle.

15. The sprayer of claim 14 including:

a valve connected between the foam solution storage tank and the mixing volume; and a control circuit coupled to the valve, wherein the control circuit generates a control signal and wherein the valve modulates based upon the control signal to vary foam production.

16. The sprayer of claim 14 including:

a vent valve connected to the foam solution storage tank; and a fill valve connected to the foam solution storage tank, wherein the vent valve and the fill valve are configured such that the fill valve cannot be opened until the vent valve is opened.

17. A field marking system for use with a vehicle having an engine with a turbo charger and ground engaging motive members, the system comprising:

a marking solution storage tank;

a mixing volume fluidly connected to the storage tank and configured for mixing marking solution from the marking solution storage tank with pressurized air; and a nozzle fluidly connected to the mixing volume, wherein the mixing volume is adapted to be pneumatically coupled to the turbo charger, whereby the turbocharger supplies pressurized air, without further mechanical compression, to the mixing volume and to the field marking system while the engine is driving the ground engaging motive members.

18. An agricultural applicating system comprising:

a material storage tank;

a mixing volume connected to the storage tank and configured to mix material from the material storage tank with pressurized air;

an applicator connected to the mixing volume;

an engine including a turbocharger, wherein the turbocharger supplies pressurized air to the mixing volume;

a vent valve connected to the tank; and a fill valve connected to the tank, wherein the vent valve and the fill valve are configured such that the fill valve cannot be opened until the vent valve is opened.

19. A field marking system comprising:

a marking solution storage tank;

a mixing volume fluidly connected to the storage tank and configured to mix marking solution from the storage tank with pressurized air;

a nozzle fluidly connected to the mixing volume; and an engine including a turbo charger; and a receiver tank pneumatically connected in parallel between the turbocharger and the mixing volume.

20. The marking system of claim 19 wherein the receiving tank is further pneumatically connected in series between the turbocharger and the storage tank.

21. The marking system of claim 20 including a valve connected in series between the receiving tank and the storage tank.

* * * * *